United States Patent
Nica et al.

(10) Patent No.: US 12,412,073 B2
(45) Date of Patent: Sep. 9, 2025

(54) SUPPORTING DATABASE CONSTRAINTS IN SYNTHETIC DATA GENERATION BASED ON GENERATIVE ADVERSARIAL NETWORKS

(71) Applicant: SAP SE, Walldorf (DE)

(72) Inventors: Anisoara Nica, Waterloo (CA); Wanxin Li, Wuhan (CN)

(73) Assignee: SAP SE, Walldorf (DE)

( * ) Notice: Subject to any disclaimer, the term of this patent is extended or adjusted under 35 U.S.C. 154(b) by 1151 days.

(21) Appl. No.: 17/321,709

(22) Filed: May 17, 2021

(65) Prior Publication Data

US 2022/0374682 A1 Nov. 24, 2022

(51) Int. Cl.
G06F 16/2455 (2019.01)
G06N 3/044 (2023.01)
G06N 3/045 (2023.01)
G06N 3/08 (2023.01)

(52) U.S. Cl.
CPC ....... *G06N 3/045* (2023.01); *G06F 16/24565* (2019.01); *G06N 3/044* (2023.01); *G06N 3/08* (2013.01)

(58) Field of Classification Search
CPC .............. G06N 3/08; G06N 3/044–045; G06F 16/24565
See application file for complete search history.

(56) References Cited

U.S. PATENT DOCUMENTS

| | | | | |
|---|---|---|---|---|
| 2020/0134415 A1* | 4/2020 | Haidar | ................... | G06N 7/01 |
| 2020/0151570 A1* | 5/2020 | Ravi | ...................... | G06N 3/048 |
| 2021/0117842 A1* | 4/2021 | Smith | ................... | G06N 3/088 |
| 2021/0174960 A1* | 6/2021 | Gee | ........................ | G06N 3/045 |

FOREIGN PATENT DOCUMENTS

| | | | |
|---|---|---|---|
| CN | 109801375 B | * | 2/2021 |
| KR | 20210122533 A | * | 4/2020 |
| WO | WO202223763 A1 | * | 5/2021 |

OTHER PUBLICATIONS

Jonathan Hui, "GAN—Wasserstein GAN & WGAN-GP", published Jun. 14, 2018 to https://jonathan-hui.medium.com/gan-wasserstein-gan-wgan-gp-6a1a2aa1b490, retrieved Nov. 5, 2024. (Year: 2018).*

(Continued)

*Primary Examiner* — Shourjo Dasgupta
(74) *Attorney, Agent, or Firm* — Sterne, Kessler, Goldstein & Fox P.L.L.C.

(57) ABSTRACT

Disclosed herein are system, method, and computer program product embodiments for generating synthetic data records with database constraints using generative adversarial networks (GAN). The method can include training, by using a generator loss function, a generator neural network of a generator model of the GAN to generate a scaling factor and a cluster vector for a datum of a continuous variable of a continuous column of a data table, and a datum for a categorical variable of a categorical column of the data table. The generator loss function includes a penalty component determined based on a set of data constraints related to the continuous column or the categorical column.

21 Claims, 6 Drawing Sheets

(56) References Cited

OTHER PUBLICATIONS

"Train Wasserstein GAN with Gradient Penalty (WGAN-GP)", published Mar. 22, 2021 to https://www.mathworks.com/help/deeplearning/ug/trainwasserstein-gan-with-gradient-penalty-wgan-gp.html, retrieved Nov. 5, 2024. (Year: 2021).*

Jin-Long Wu, etc., "Enforcing Statistical Constraints in Generative Adversarial Networks for Modeling Chaotic Dynamical Systems", published May 13, 2019 to arXiv, retrieved Nov. 5, 2024. (Year: 2019).*

Tom Beucler, etc., "Enforcing Analytic Constraints in Neural Networks Emulating Physical Systems", published on Mar. 4, 2021 to Physical Review Letters 126, 098302, 2021, retrieved May 2, 2025. (Year: 2021).*

Jason Brownlee, "A Gentle Introduction to Weight Constraints in Deep Learning", published on Aug. 6, 2019 to https://machinelearningmastery.com/introduction-to-weight-constraints-to-reduce-generalization-error-in-deep-learning, retrieved May 2, 2025. (Year: 2019).*

Li, W., "Supporting Database Constraints in Synthetic Data Generation based on Generative Adversarial Networks," SIGMOD'20, Jun. 14-19, 2020, Portland, OR, USA, 3 pages.

Fan, W., "Dependencies Revisited for Improving Data Quality," Proceedings of the Twenty-Seventh ACM SIGMOD-SIGACT-SIGART Symposium on Principles of Database Systems PODS, pp. 159-170, 2008.

Park, N. et al. "Data Synthesis based on Generative Adversarial Networks," Proceedings of the VLDB Endowment, 11(10):1071-1083, 2018.

Patki, N. et al., "The synthetic data vault," 2016 IEEE International Conference on Data Science and Advanced Analytics (DSAA), pp. 399-410, 2016.

Xu, J. et al., "A Semantic Loss Function for Deep Learning with Symbolic Knowledge," pp. 5498-5507, 2018.

Xu, L. and Veeramachaneni, K., "Synthesizing tabular data using generative adversarial networks," arXiv preprint arXiv:1811.11264, 2018.

\* cited by examiner

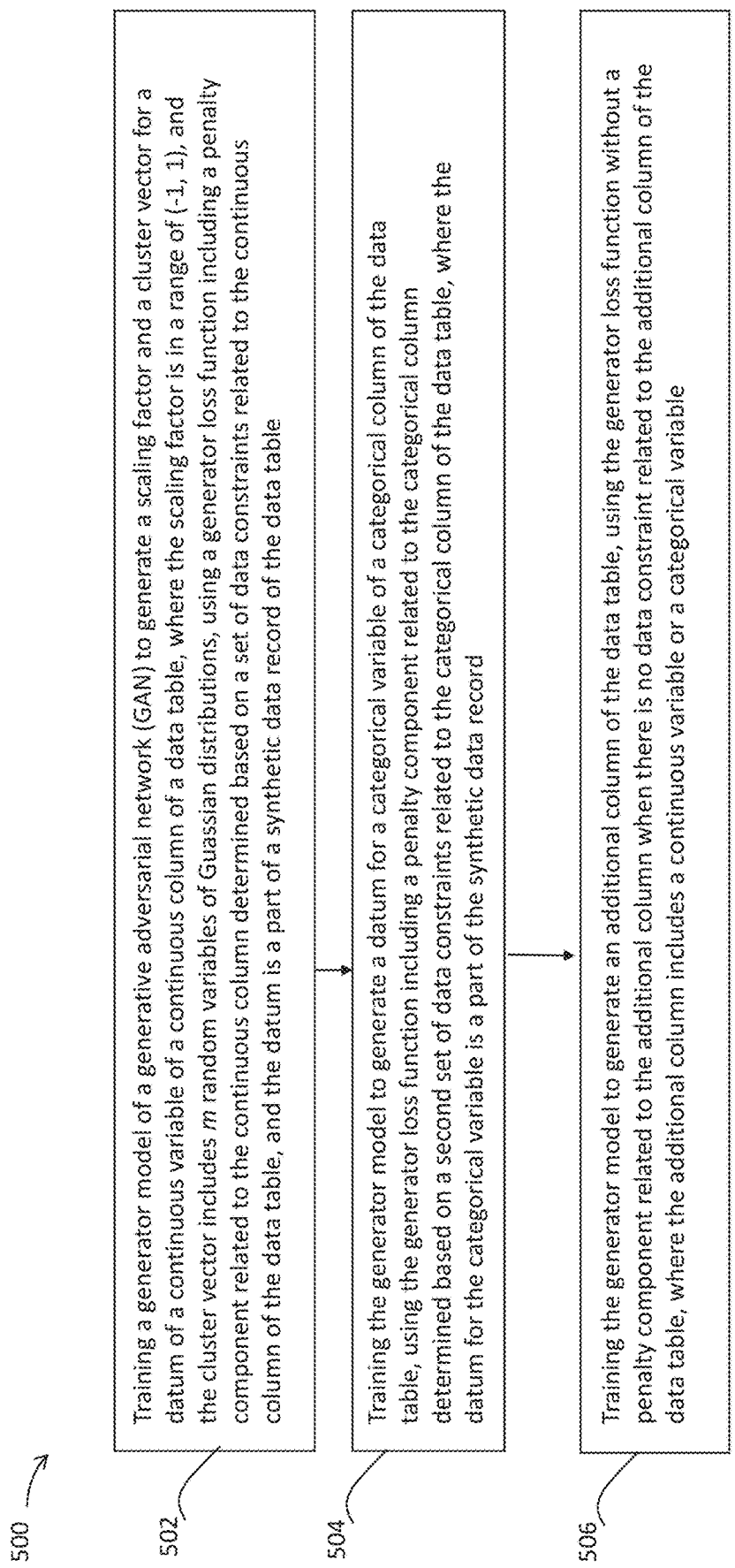

502 Training a generator model of a generative adversarial network (GAN) to generate a scaling factor and a cluster vector for a datum of a continuous variable of a continuous column of a data table, where the scaling factor is in a range of (-1, 1), and the cluster vector includes $m$ random variables of Guassian distributions, using a generator loss function including a penalty component related to the continuous column determined based on a set of data constraints related to the continuous column of the data table, and the datum is a part of a synthetic data record of the data table 504 Training the generator model to generate a datum for a categorical variable of a categorical column of the data table, using the generator loss function including a penalty component related to the categorical column determined based on a second set of data constraints related to the categorical column of the data table, where the datum for the categorical variable is a part of the synthetic data record 506 Training the generator model to generate an additional column of the data table, using the generator loss function without a penalty component related to the additional column when there is no data constraint related to the additional column of the data table, where the additional column includes a continuous variable or a categorical variable

SUPPORTING DATABASE CONSTRAINTS IN SYNTHETIC DATA GENERATION BASED ON GENERATIVE ADVERSARIAL NETWORKS

BACKGROUND

A database is an organized collection of data, generally stored in and accessed electronically from a computer system. A database model is a type of data model that determines the logical and operational structure of a database, e.g., the manner data can be stored, organized, and manipulated. An example of a database model is the relational model, which uses a table-based format. Database plays an indispensable role in big data, machine learning, business intelligence, and many other applications. In the big data era, sharing data with partners or releasing data to the public frequently occurs. For example, in order to develop efficient machine learning algorithms, it is crucial to have available large amount of data to verify the correctness and efficiency of machine learning algorithms. Due to privacy concerns, there may not be enough real data to use. Solutions are desired to improve the data availability while maintain privacy.

BRIEF DESCRIPTION OF THE DRAWINGS

The accompanying drawings are incorporated herein and form a part of the specification.

FIG. 5 illustrates an example process for a GAN to generate synthetic data records with database constraints, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
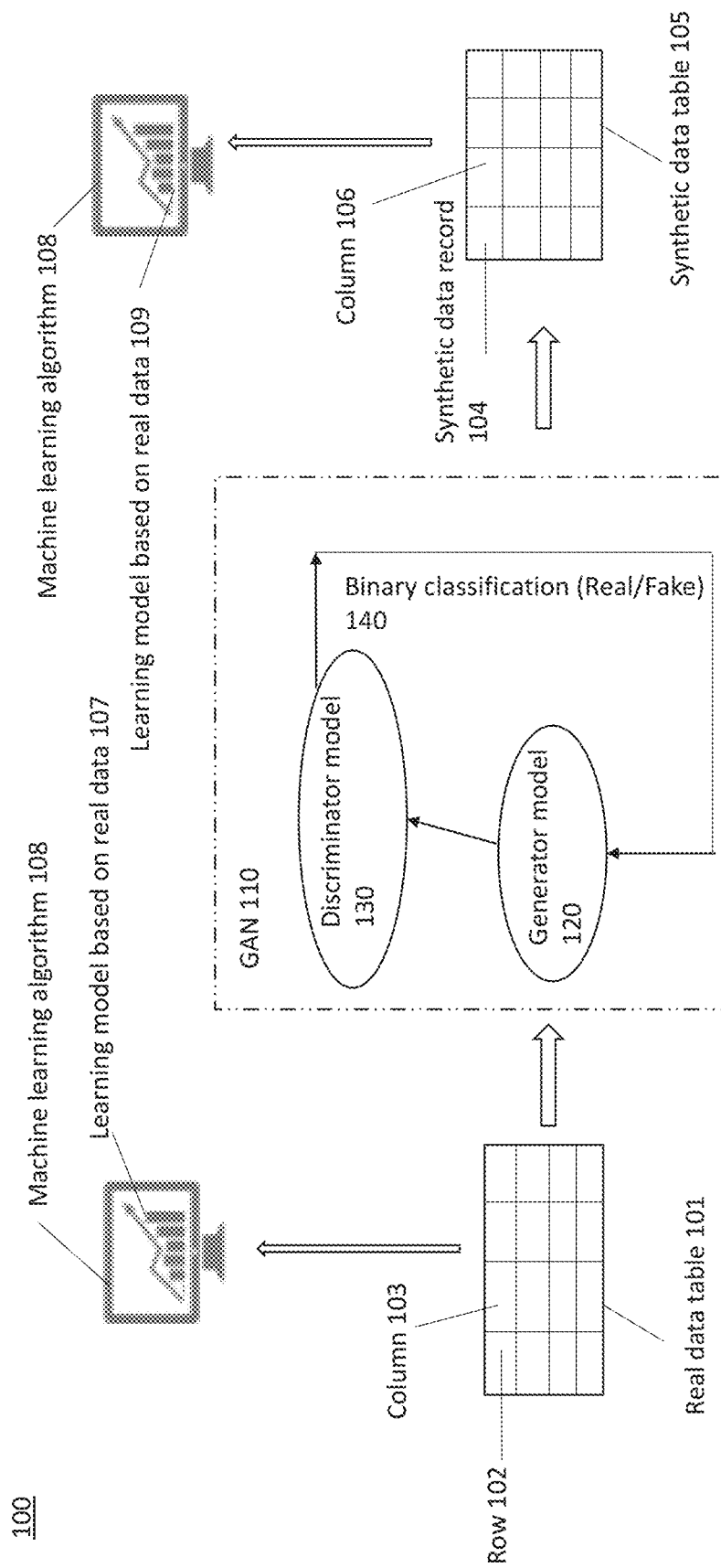
FIG. 1 is a flow diagram illustrating a system for generating synthetic data records with database constraints using generative adversarial networks (GAN), according to some embodiments.

Provided herein are system, apparatus, device, method and/or computer program product embodiments, and/or combinations and sub-combinations thereof, for generating synthetic data with database constraints using generative adversarial networks (GAN). A database can be built based on a database model, operated on a computing platform, and often accessed through a network connection. A database stores data in a specific format determined by the database model and/or the computing platform. For example, based on a relational model, a database can use a table-based format to store data records. Sharing data with partners or releasing data to the public frequently occurs. However, due to privacy concerns, it may not be safe to use real data in certain situations. To protect privacy, some anonymization techniques can change data record by removing identifiers, e.g., social security numbers, and modifying quasi-identifiers, e.g., gender, ZIP code, age, occupation, and so forth. However, other sensitive attributes of the data record may still be disclosed without any modification in an anonymized database. Data perturbation is another technique to change or add noise to real data values. Unfortunately, data usability is negatively impacted after these modifications.

Artificially generated synthetic data similar to the real world data is one way to satisfy the need for big data while maintaining privacy. Synthetic data can be generated by modeling a joint multivariate probability distribution for a given dataset, or using randomization-based methods. Generative adversarial networks (GAN) using neural network models provide an additional approach for generating synthetic data.

However, the current approaches based on GAN or other techniques for generating synthetic data often fail to consider database constraints of the real data, which should be maintained on generated synthetic data. Database constraints are different from the probability distribution of variables of a data table. Classical statistical distributions cannot describe complex and mixed distributions in relational databases. Instead, database constraints may often be represented by Boolean functions. Theoretically, data records can be generated first, and those data records violating database constraints can be filtered out after generation. However, this simple approach can cause a large portion of the generated synthetic data records being thrown way, wasting computing power and reducing the efficiency.

In some embodiments, synthetic data records can be generated by GAN, e.g., Tabular Generative Adversarial Network (TGAN). A GAN can include a generator model including a generator neural network, and a discriminator model including a discriminator neural network. The generator neural network can be trained by minimizing a generator loss function. Instead of considering only a normal generator loss function, the generator loss function can include a penalty component related to a column of a data table based on a set of data constraints related to the column of the data table. In addition to the penalty component, the generator loss function can further include components such as an original loss component, an information loss component, or a classification loss component. Similar discriminator penalty component can be used for the discriminator neural network, where the discriminator penalty component is related to a column of the data table based on the set of constraints related to the column of the data table. Hence, the likelihood of generating invalid records violating the set of data constraints can be reduced, sometime significantly. As a consequence, the efficiency of generating synthetic data satisfying data constraints can be improved.

FIG. 1 is a flow diagram illustrating a system 100 for generating synthetic data records with database constraints using GAN 110, according to some embodiments. In some embodiments, system 100 includes a GAN 110 to generate a synthetic data table 105, which can be supplied to a machine learning algorithm 108 to generate a machine learning model 109. Machine learning model 109 generated based on synthetic data table 105 is comparable to a machine learning model 107 generated based on a real data table 101 by machine learning algorithm 108. In other words, machine learning model 109 learned using synthetic data table 105 can achieve a similar accuracy or show the same behaviors, e.g., model compatibility, on a real test table, as would machine learning model 107 learned using real data table 101.

Real data table 101 can include one or more rows, where each row is a data record, e.g., data record 102. Real data table 101 can also include one or more columns, e.g., column 103. Column 103 can be a continuous column of real data table 101 when the value of column 103 is of continuous variable, e.g., a real number. Alternatively, column 103 can be a categorical column of real data table 101 when the value of column 103 is of categorical variable, e.g., a finite number of choices, or discrete values. Similarly, synthetic data table 105 can include one or more rows, where each row is a data record, e.g., data record 104. Synthetic data table 105 can also include one or more columns, e.g., column 106. Column 106 can be a continuous column or a categorical column.

Synthetic data table 105 is generated by GAN 110, which includes a generator model 120, a discriminator model 130 to perform a binary classification. Binary classification result 140 can be feed into generator model 120. Synthetic data table 105 and real data table 101 can include $n_c$ continuous variables $\{C_1, \ldots, C_{n_c}\}$, and $n_d$ categorical variables $\{D_1, \ldots, D_{n_d}\}$. These variables follow an unknown joint distribution $P(C_{1:n_c}, D_{1:n_d})$. Each row j is one sample from the joint distribution represented using a lowercase $\{c_{1,j}, \ldots, c_{n_c,j}, d_{1,j}, \ldots, d_{n_d,j}\}$. In addition, the mutual information between an arbitrary pair of variables in synthetic data table 105 and similar real data table 101 is similar.

Synthetic data table 105 or real data table 101 can be included in a relational database, which can be implemented in various language or by various vendors, e.g., Oracle®, MySQL, PostgreSQL, Spanner, or others. The techniques described herein can be equally applicable to other databases, e.g., multi-model databases supporting different data models.

Figure 2:
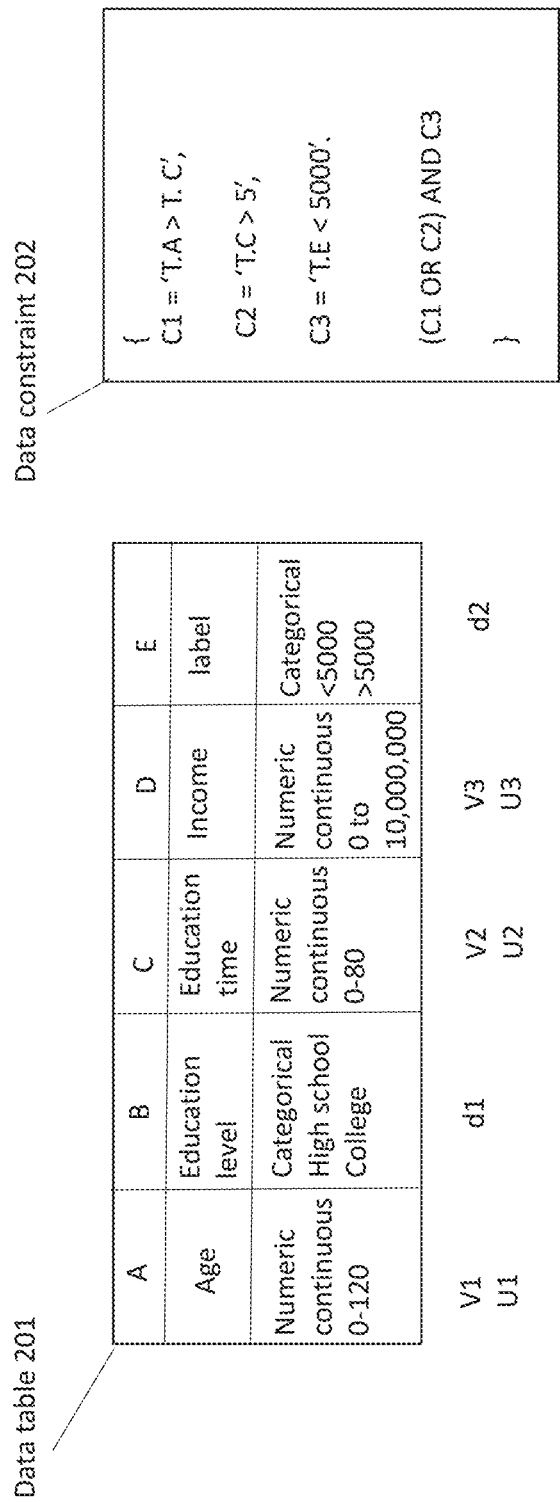
FIG. 2 is an example data table of a database with a set of data constraints, according to some embodiments.

FIG. 2 is example data table 201 with a set of data constraints, according to some embodiments. Table 201 can be included in synthetic data table 105 or real data table 101. Table 201 can include various columns, e.g., column A representing an age of a person, column B representing an education level of a person, column C representing an education time of a person, column D representing an income of a person, and column E representing a label of a person. Such a table can be denoted as T(A, B, C, D, E), where T represents a Table with columns A, B, C, D, and E. Tables of different columns can be represented by similar notations.

In some embodiments, column A, column C, and column D can be a continuous column, since a value of those columns can be a datum of a continuous variable. For example, an age of a person in column A can be a datum of a real value between 0 and 120, e.g., 23.4 years old. Similarly, an education time of a person in column C can be a datum of a real value between 0 and 80, e.g., 11.5 years education time. An income of a person in column D can be a datum of a real value between 0 and 10,000,000. On the other hand, column B and column E can be a categorical column, since a value of those columns can be a datum of a categorical variable. For example, an education level of a person in column B can be a datum selected from a high school graduate, a college graduate, and a post-graduate degree holder. Similarly, a label of a person in column F can be a datum selected as either >5000 or <5000. Table 201 is shown for illustration purpose only, and may or may not have a real world usage.

In some embodiments, a set of data constraints can include one or more data constraints, e.g., data constraint 202. Data constraint 202 can include one or more atomic constraints, e.g., an atomic constraint C1, an atomic constraint C2, and an atomic constraint C3. C1 is specified as T.A>T.C, which means the value of column A in the table is greater than the value of column C in the table. In the current example, the value of column C is the education time, and the value of column A is the age of the person. Hence, the age of the person at column A must be greater than the education time of the person at column C. C2 is specified as T.C>5, which means that a person has received at least 5 years education since the value of column C represents the education time. Furthermore, C3 is specified as T.E<5000, which means that a person is in the category of <5000 at column E. Data constraint 202 can be formed by logical operations among the atomic constraints. For example, data constraint 202 is formed by C1 OR C2 AND C3.

An atomic constraint can be manipulated into different forms. For example, C2 is specified as T.C>5. Alternatively, C2 can be specified as T.C−5>0, where a 0 is on a right hand side of the equation. In general, any atomic constraint can be converted into an atomic constraint including an equation with 0 on a right hand side of the equation. For a given set of data constraints $\mathscr{L}$, $\mathscr{L}$ can be split into atomic constraints $\{\mathscr{L}_1, \ldots, \mathscr{L}_T\}$. For example, for a table T(A, B, C, D, E), $\mathscr{L} = \{T.A \geq T.B \text{ OR } T.D \neq 3\}$ can be split into atomic constraints $\mathscr{L}_1 = \{T.A \geq T.B\}$, $\mathscr{L}_2 = \{T.D \neq 3\}$. Each atomic constraint can be further converted into an equation with 0 on a right hand side, e.g., $\mathscr{L}_1 = \{T.A-T.B \geq 0\}$, $\mathscr{L}_2 = \{T.D-3 \neq 0\}$. In addition, an atomic constraint, e.g., $\mathscr{L}_1 = \{T.A-T.B \geq 0\}$ can be represented by an equation, and an operator, e.g., $\mathscr{L}_1 = \{T.A-T.B \geq 0\}$ can have an equation $X_f = T.A-T.B$, with an operator, op=≥. The different formats of an atomic constraint can be used for different purposes, e.g., more efficient manipulation of the atomic constraints.

Figure 3:
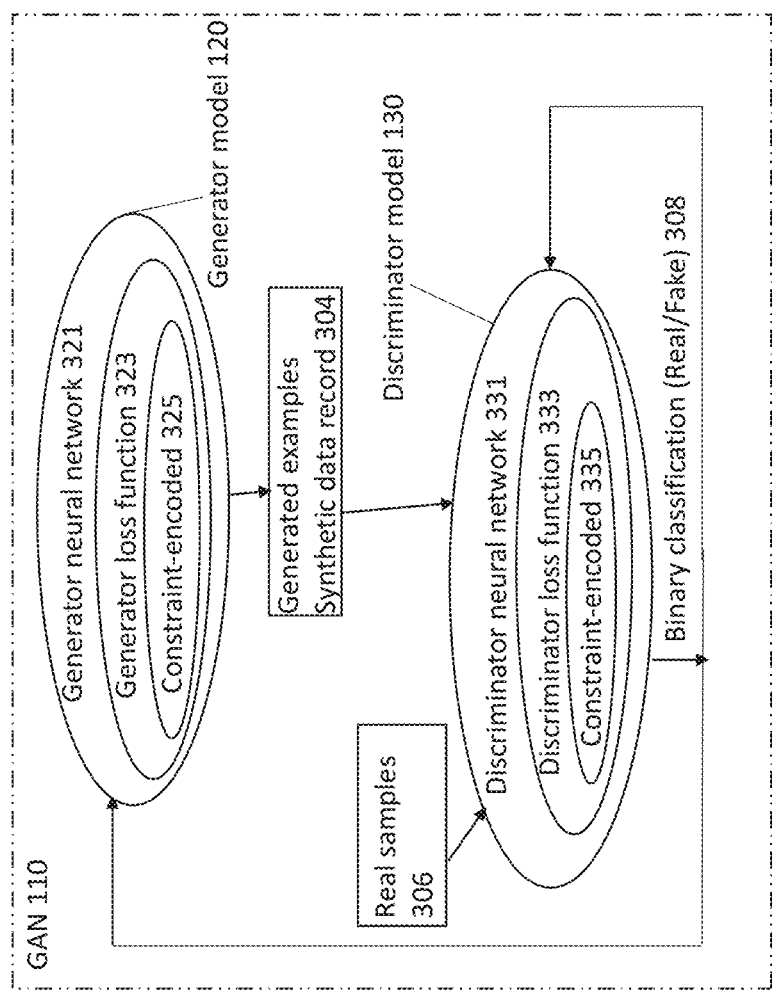
FIG. 3 is a diagram illustrating a GAN for generating synthetic data records with database constraints, according to some embodiments.

FIG. 3 is a diagram illustrating GAN 110 for generating synthetic data records, e.g., synthetic data record 104, with database constraints, according to some embodiments. GAN 110 includes generator model 120 (G) and discriminator model 130 (D). Generator model 120 includes a generator neural network 321, and discriminator model 130 includes a discriminator neural network 331.

In some embodiments, during the adversarial training process, generator model 120 learns the probability distribution of real data, and generates fake samples, synthetic data record 304, that can deceive discriminator model 130. At the same time, discriminator model 130 can receive real samples 306 and synthetic data record 304, generate a binary classification 308 to distinguish synthetic data record 304 from real samples 306.

In some embodiments, the learning process GAN 110 is based on generator neural network 321 and discriminator neural network 331 playing the following zero-sum minimax (i.e., adversarial) game.

$$\min_G \max_D V(G,D) = \mathbb{E}[\log D(x)]_{x \sim P(x)} + \mathbb{E}[\log(1-D(G(z)))]_{z \sim P(z)},$$

where P(z) is a prior distribution of latent vector z, G(•) is a generator function, and D(•) is a discriminator function whose output spans [0, 1]. D(x)=0 (resp. D(x)=1) indicates that the discriminator model 130 (D) classifies a sample x as generated or real data.

Accordingly, discriminator model 130 (D) attempts to maximize the objective, whereas generator model 120 (G) attempts to minimize the objective. In other words, discriminator model 130 attempts to distinguish between real and generated samples, while generator model 120 attempts to generate realistic fake samples that discriminator model 130 cannot distinguish from real samples.

In some embodiments, generator neural network 321 can include a long-short term memory (LSTM) neural network, and discriminator neural network 331 can include a multi-layer perceptron (MLP) neural network or a convolutional neural network (CNN). Both generator neural network 321 and discriminator neural network 331 can include multiple layers.

In some embodiments, generator neural network 321 and discriminator neural network 331 are trained by minimizing a loss function, which can be a prediction error. For example, generator neural network 321 can be trained by a generator loss function 323, and discriminator neural network 331 can be trained by a discriminator loss function 333. A loss function can be referred to as an objective function or a cost function as well. The loss function represents the various design advantages and disadvantages of a neural network candidate down to a single number, a scalar value, which allows candidate neural networks to be ranked and compared. Generator loss function 323 and discriminator loss function 333 can be various forms, e.g., cross-entropy, also referred to as logarithmic loss.

In some embodiments, generator loss function 323 can include various components, e.g., an original loss component, an information loss component defined as a discrepancy between two statistics of synthetic and real data records, and a classification loss component defined as a discrepancy between a predicted label by the generator model and a synthesized label.

In some embodiments, generator loss function 323 can include a penalty component related to one or more data constraints for a data table. For example, generator loss function 323 can include a penalty component 325 related to data constraint 202 shown in FIG. 2. Similarly, discriminator loss function 333 can include a discriminator penalty component 335 related to the set of constraints of the data table, e.g., related to data constraint 202.

As shown in FIG. 2, data constraint 202 can include one or more atomic constraints, e.g., an atomic constraint C1, an atomic constraint C2, and an atomic constraint C3. When a set of data constraints includes a first atomic constraint and a second atomic constraint, the first atomic constraint can be associated with a first atomic penalty component for generator loss function 323, the second atomic constraint can be associated with a second atomic penalty component for generator loss function 323, and penalty component 325 of generator loss function 323 can be determined based on the first atomic penalty component and the second atomic penalty component and the logical operator connecting these two components.

In more detail, the set of data constraints can include a data constraint formed by a logical operation between the first atomic constraint and the second atomic constraint, and the data constraint generates a penalty component associated with the data constraint that is included in the penalty component of the generator loss function. The penalty component associated with the data constraint is formed by softmax or softmin operations of the first atomic constraint and the second atomic constraint.

The following Table 1 provides some example constraints, while Table 2 shows the penalty component associated with the data constraint formed by softmax or softmin operations.

TABLE 1

| Constraint form | Op = | Op ≠ |
|---|---|---|
| T.A − c = 0/T.A − c ≠ 0 | $1 - d'^c_A$ | $d'^c_A$ |
| T.A − T.B = 0/T.A − T.B ≠ 0 | | $\text{sum}(\text{abs}(d'_A - d'_B))/|A|$ |

TABLE 2

| | Constraint type | | |
|---|---|---|---|
| penalty type | $\mathscr{L}_i(X_t) = 0$ | $\mathscr{L}_i(X_t) \neq 0$ | $\mathscr{L}_i(X_t) \geq 0$ |
| penalty_cat (categorical) | $\mathscr{L}_i(X_t)$ | T.A − T.B = 0 −$\mathscr{L}_i(X_t)$ | T.A − c = 0 $\mathscr{L}_i(X_t)$ | NA |
| penalty_cont (continuous) | $-e^{\beta \mathscr{L}_t(X_t)^2} + 1$ | $e^{\beta \mathscr{L}_t(X_t)^2}$ | $\dfrac{1}{1+e^{\gamma \mathscr{L}_t(X_t)}}$ |

In Table 1, $\mathscr{L}_i(X_t)$ represents a data constraint for categorical variables of the form of T.A−c=(≠)0 or T.A−T.B=(≠)0 for the table T(A, B), and c is the $c^{th}$ category of T.A, |A| is the total number of categories of T.A, $d'_A$ is a vector of the estimated probabilities for A's categories, $d'^c_A$ is the estimated probability for the $c^{th}$ category of T.A, abs takes the absolute value, and sum takes the sum of vector elements. In Table 2, "penalty_cat" represents a penalty component associated with a categorical variable, and "penalty_cont" represents a penalty component, which can be represented as ap, associated with a continuous variable. β<0 and γ>0. In some embodiments, β=−0.1, γ=1.

Formulae in Table 2 are differentiable approximations to quantify the satisfiability of the constraints. The formula for the final penalty component, ap, can be obtained by combine $ap_t$ given the original $\mathscr{L}$: For example, $\mathscr{L} = (\mathscr{L}_1 \text{ OR } \mathscr{L}_2)$ AND $\mathscr{L}_3$ then ap=softmax(softmin($ap_1$, $ap_2$), $ap_3$), where softmax and softmin are differentiable approximations to max and min. For AND constraints, to enforce all individual constrains, we use softmax to choose the maximum penalty. Conversely, for OR constraint, since only one constraint needs to be satisfied, we use softmin to choose the minimum penalty.

In some embodiments, various generator loss functions can be used.

$$*\text{gloss}_1 = \text{original\_loss} + ap \quad (1)$$

$$*\text{gloss}_2 = \text{original\_loss} * (1+ap) \quad (2)$$

The range for original loss is [0, ∞], and the range for ap is [−1, 1]. In some embodiments, the generator loss function of (2) can be chosen over (1) as the multiplication in (2) uses ap to penalize original loss, whereas the addition in (1) can be problematic if original loss and ap are not of the same scale.

In some embodiments, generator neural network 321 can be trained by using generator loss function 323 to generate synthetic data record 304 of a data table. Generator loss function 323 includes penalty component 325 related to the set of data constraints. Synthetic data record 304 can be provided to discriminator neural network 331 of discriminator model 130. Discriminator neural network 331 can be trained by using discriminator loss function 333 that includes penalty component 335 related to the set of data constraints. Discriminator neural network 331 receives synthetic data record 304 and real data record 306 for the data table, and performs a binary classification to generate classification result 308 to indicate generated synthetic data record 304 as synthetic and the real data record 306 as real. Discriminator neural network 331 provides classification result 308 to generator neural network 321. Generator neural network 321 receives classification result 308 from discriminator neural network 331, further generates a next synthetic data record 304, based on classification result 308.

Figure 4:
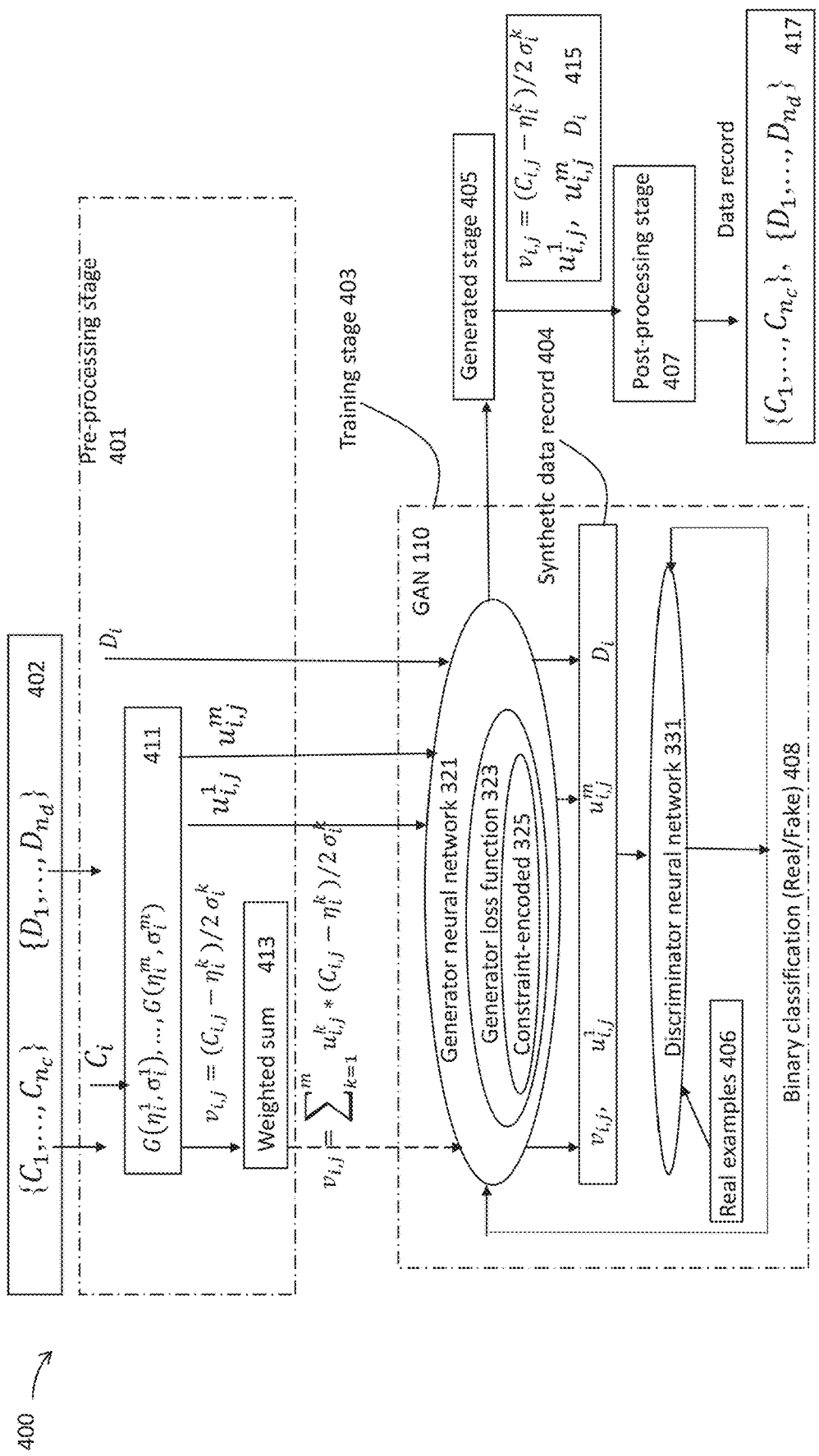
FIG. 4 illustrates an example process using a GAN to generate synthetic data records with database constraints, according to some embodiments.

FIG. 4 illustrates an example process 400 using GAN 110 to generate synthetic data records with database constraints, according to some embodiments. According to some aspects, for a table including ne continuous columns $\{C_1, \ldots, C_{n_c}\}$ and $n_d$ categorical columns $\{D_1, \ldots, D_{n_d}\}$, for a continuous column $C_i$, at the pre-processing stage, process 400 generates a scaling factor $v_{i,j}$ and a cluster vector $u_{i,j}^k$ for a datum of a continuous variable for continuous column $C_i$. GAN 110 is used to generate synthetic data records based on the scaling factor $v_{i,j}$ and the cluster vector u for continuous column $C_i$. Hence, synthetic data records generated by GAN 110 has more columns than the initial data table including ne continuous columns $\{C_1, \ldots, C_{n_c}\}$ and $n_d$ categorical columns $\{D_1, \ldots, D_{n_d}\}$. At the post-processing stage, the synthetic data records generated by GAN 110 are converted back into the initial format having $n_c$ continuous columns $\{C_1, \ldots, C_{n_c}\}$ and $n_d$ categorical columns $\{D_1, \ldots, D_{n_d}\}$.

According to some aspects, process 400 can include four stages: pre-processing stage 401, training stage 403, generation stage 405, and post-processing stage 407.

At re-processing stage 401, a table of a first size is indicated by input 402 that can include ne continuous columns $\{C_1, \ldots, C_{n_c}\}$ and $n_d$ categorical columns $\{D_1, \ldots, D_{n_d}\}$. A table of a second size, e.g., a second number of columns is generated after pre-processing 401. At training stage 403, GAN 110 is used to generate synthetic data record 404 that contains the second number of columns. After GAN 110 is well trained to produce quality output, at generation stage 405, GAN 110 can produce a quality synthetic data record, a synthetic data output 415. In post-processing, operations are performed on synthetic data output 405 to generate a synthetic data record 407 having ne continuous columns $\{C_1, \ldots, C_{n_c}\}$ and $n_d$ categorical columns $\{D_1, \ldots, D_{n_d}\}$.

In pre-processing stage 401, columns of a data table are divided into continuous columns $\{C_1, \ldots, C_{n_c}\}$, and $n_d$ categorical columns $\{D_1, \ldots, D_{n_d}\}$. A continuous column $C_i$ has a value of a continuous variable, and a categorical column $D_i$ has a value of a categorical variable. For a continuous column $C_i$, a scaling factor $v_{i,j}$, and a cluster vector $u_{i,j}^k$ for a datum of a continuous variable are generated. The scaling factor $v_{i,j}$ is in a range of $(-1, 1)$, the cluster vector $u_{i,j}^k$ includes m random variables of Gaussian distributions. In some examples, the datum of the continuous variable is generated based on a weighted sum 413 of the scaling factor $v_{i,j}$, and the cluster vector $u_{i,j}^k$ at a pre-processing stage 401.

In training stage 403, by using generator loss function 323, generator neural network 321 of GAN 110 can be trained to generate the scaling factor $v_{i,j}$ and the cluster vector $u_{i,j}^1, \ldots, u_{i,j}^m$ for a datum of a continuous variable of continuous column $C_i$. Generator loss function 323 includes a penalty component 325 related to continuous column $C_i$ determined based on a set of data constraints related to continuous column $C_i$, and generator neural network 321 is trained by minimizing generator loss function 323 including penalty component 325.

In addition, generator neural network 321 of GAN 110 can be trained to generate a datum for a categorical variable of a categorical column $D_i$, using generator loss function 323 including penalty component 325 related to categorical column $D_i$ determined based on a set of data constraints related to categorical column $D_i$.

Furthermore, generator neural network 321 of GAN 110 can be trained to generate an additional column of the data table, using generator loss function 323 without a penalty component related to the additional column when there is no data constraint related to the additional column. The additional column can include a continuous variable or a categorical variable.

According to some aspects, generator neural network 321 of GAN 110 can be trained to generate a synthetic data record 404 that includes the scaling factor $v_{i,j}$ and the cluster vector $u_{i,j}^1, \ldots, u_{i,j}^m$ for a datum of a continuous variable of continuous column $C_i$, a datum for a categorical variable of a categorical column $D_i$, and any an additional column. The additional column may not have a penalty component related to the additional column when there is no data constraint related to the additional column.

According to some aspects, discriminator neural network 331 can be trained to perform the binary classification, using discriminator loss function 333 including discriminator penalty component 335 related to continuous column CL or categorical column $D_i$ determined based on the set of constraints related to the continuous variable of the continuous column, or related to the categorical variable of the categorical column. The generated synthetic data record 404 can be provided to the discriminator neural network 331. Discriminator neural network 331 is configured to receive synthetic data record 404 and a real data record 406, to perform a binary classification to generate classification result 408 to indicate the generated synthetic data record 404 as synthetic and the real data record 406 as real, and further to provide classification result 408 to generator neural network 331. Generator neural network 331 can receive classification result 408 from discriminator neural network 331, and generate, based on classification result 408, synthetic data record 404 including the datum of the continuous variable of the continuous column, and datum of the categorical variable of the categorical column.

In detail, at pre-processing stage 401, for continuous column $C_i$, a Gaussian mixed model 411 of m components, $G(f_i^1, \sigma_i^1), \ldots, G(\eta_i^m, \sigma_i^m)$, can be built. $u_{i,j}^k$ is the estimated probability of the $j^{th}$ value of $C_i(c_{i,j})$ coming from $G(\eta_i^k, \sigma_i^k)$, where $k=1, \ldots, m$. $v_{i,j}$ is the scaling factor for $c_{i,j}$ computed by $v_{i,j}=(C_{i,j}-\eta_i^k)/2\sigma_i^k$, where $k=\arg_k \max u_{i,j}^k$. Alternatively, the datum of the continuous variable is generated based on weighted sum 413 of the scaling factor and the cluster vector at a pre-processing stage $$v_{i,j} = \frac{\sum_{k=1}^{m} u_{i,j}^k * (C_{i,j} - \eta_i^k)}{2\sigma_i^k}.$$

For a categorical column $D_i$, the $j^{th}$ value of $D_i(d_{i,j})$ is represented by one-hot encoding with random noise. $d_{i,j}^k$ is the estimated probability of $d_{i,j}$ coming from the $k^{th}$ category. As a result, the variables $v_{i,j}$, $u_{i,j}^k$, and $d_{i,j}$ can be provided as inputs to GAN 110.

At training stage 403, generator neural network 321 can take $v_{1:n_c,j}, u_{1:n_c,j}, d_{1:n_d,j}$, and produces $v'_{1:n_c,j}, u'_{1:n_c,j}, d'_{1:n_d,j}$ as synthetic data record 404. Generator neural network 321 can be iteratively trained to generate increasingly more qualified $v'_{1:n_c,j}, u'_{1:n_c,j}, d'_{1:n_d,j}$, as synthetic data record 404. In some examples, a weighted sum of the scaling factor and the cluster vector can also be generated at training stage 403.

In generation stage 405, generator neural network 321 generates a final set of $v'_{1:n_c,j}$, $u'_{1:n_c,j}$, $d'_{1:n_d,j}$, which is synthetic data output 415.

In post-processing 407, operations can be performed on synthetic data output 415 including scaling factor and a cluster vector to generate the data record 417 for the table, $c'_{i,j} = 2v'_{i,j}\sigma_i^{k'} + \eta_i^{k'}$, where $k' = \arg_{k'} \max u_{i,j}^{k'}$, and $d'_{i,j} = \arg_{k'} \max d_{i,j}^{k'}$. All $c'_{i,j}$ and $d'_{i,j}$ are form the generated relational table which is returned by the algorithm. In post-processing stage 407, a weighted sum of the scaling factor and the cluster vector can be generated as well, $c'_{i,j} = \Sigma_{k=1}^{m} u_{i,j}^{'*} (2v'_{i,j}\sigma_i^{k'} + \eta_i^{k'})$.

FIG. 5 illustrate an example process 500 for a GAN to generate synthetic data records with database constraints, according to some embodiments. Method 500 can be performed by GAN 110. Processes 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 4A-4C, as will be understood by a person of ordinary skill in the art.

At 502, generator neural network 321 can be trained to generate a scaling factor and a cluster vector for a datum of a continuous variable of a continuous column of a data table. For example, as shown in training stage 403, generator neural network 321 can be trained to generate a scaling factor $v_{i,j}$ and a cluster vector $u_{i,j}^1, \ldots, u_{i,j}^m$ for a datum of a continuous variable of continuous column $C_i$. The scaling factor $v_{i,j}$ can be in a range of (−1, 1), and the cluster vector $u_{i,j}^1, \ldots, u_{i,j}^m$ includes m random variables of Gaussian distributions. The scaling factor $v_{i,j}$ and the cluster vector $u_{i,j}^1, \ldots, u_{i,j}^m$ are generated using generator loss function 323 including penalty component 325 related to the continuous column determined based on a set of data constraints related to the continuous column.

At 504, generator neural network 321 can be trained to generate a datum for a categorical variable of a categorical column of the data table. The datum for the categorical variable can be generated using the generator loss function including a penalty component related to the categorical column determined based on a set of data constraints related to the categorical column. The datum for the categorical variable is a part of the synthetic data record. For example, as shown in training stage 403, generator neural network 321 can be trained to generate a datum for a categorical variable of categorical column $D_i$ using generator loss function 323 including penalty component 325 based on a set of data constraints related to categorical column $D_i$.

At 506, generator neural network 321 can be trained to generate an additional column of the data table, using the generator loss function without a penalty component related to the additional column when there is no data constraint related to the additional column of the data table, where the additional column includes a continuous variable or a categorical variable. For example, as shown in training stage 403, generator neural network 321 can be trained to generate an additional column of the data table, using generator loss function 323. Penalty component 325 of generator loss function 323 is not related to the additional column.

Figure 6:
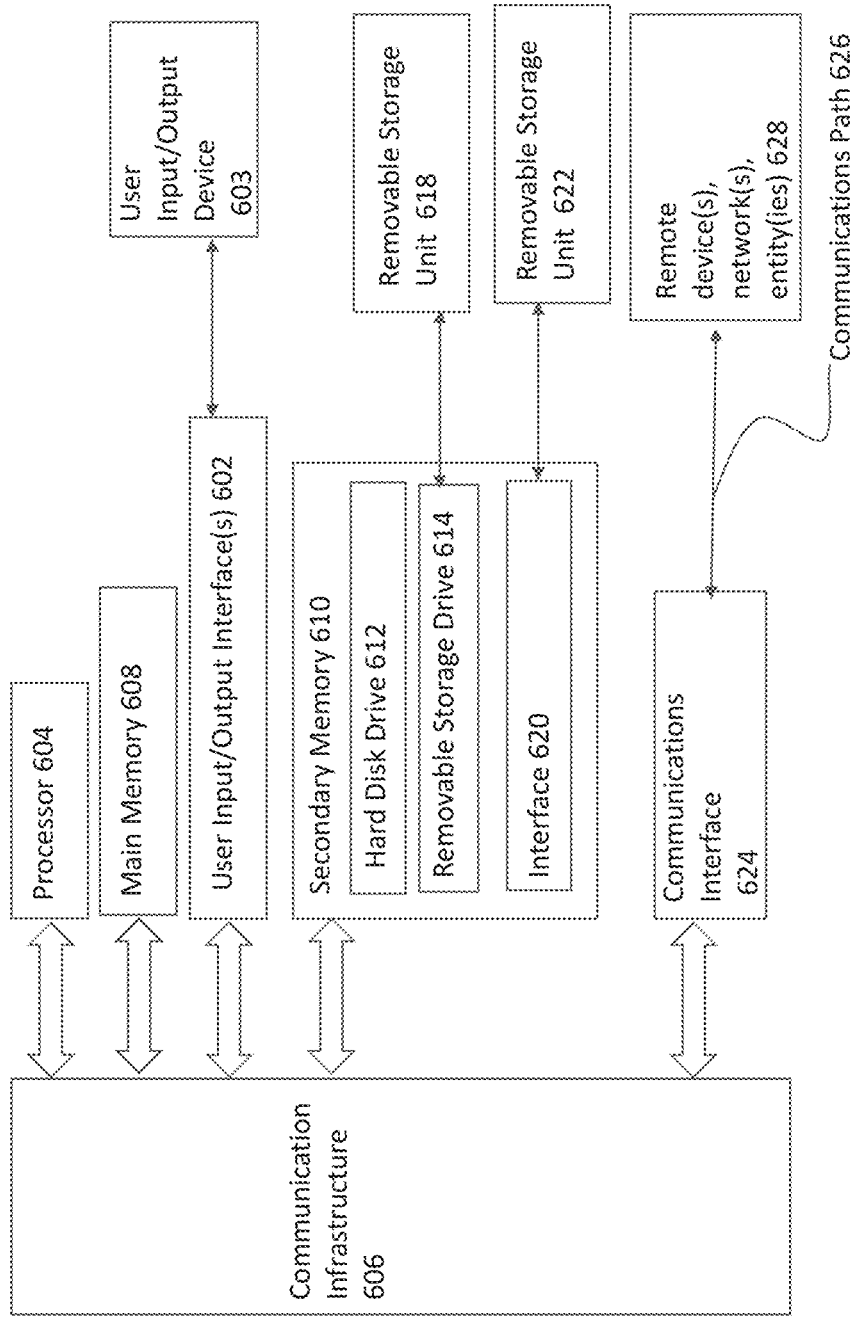
FIG. 6 is an example computer system useful for implementing various embodiments.

Various embodiments can be implemented, for example, using one or more computer systems, such as computer system 600 shown in FIG. 6. Computer system 600 can be used, for example, to implement processes 400 of FIG. 4 or process 500 of FIG. 5. For example, computer system 600 can implement and execute a set of instructions comprising operations for generating synthetic data records with database constraints using GAN 110, as shown in FIGS. 1-3. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a generative adversarial network (GAN), comprising:

training, by using a generator loss function, a generator neural network of a generator model of the GAN to generate a scaling factor and a cluster vector for a datum of a continuous variable of a continuous column of a data table of a database stored in and accessed electronically from a computer system, wherein the scaling factor is in a range of $(-1, 1)$, the cluster vector includes m random variables of Gaussian distributions, the generator loss function includes a penalty component related to the continuous column determined based on a set of data constraints related to the continuous column, and the generator neural network is trained by minimizing the generator loss function including the penalty component, wherein the set of data constraints includes a data constraint formed by a logical operation between a first atomic constraint and a second atomic constraint, and the penalty component of the generator loss function comprises an associated penalty component associated with the data constraint and formed by softmax or softmin operations related to the first atomic constraint and the second atomic constraint;

training, by using the generator loss function, the generator neural network to generate a synthetic data record of the data table to protect privacy, wherein the synthetic data record includes the datum of the continuous variable;

providing the synthetic data record to a discriminator neural network of a discriminator model of the GAN, wherein the discriminator neural network is configured to receive the synthetic data record and a real data record for the data table, to perform a binary classification to generate a classification result to indicate the synthetic data record as synthetic and the real data record as real, and further to provide the classification result to the generator neural network.

2. The method of claim 1, further comprising:

receiving, by the generator model, the classification result from the discriminator model, wherein the synthetic data record is generated based on the classification result.

3. The method of claim 1, wherein the set of data constraints is a first set of data constraints, and the method further comprises:

training the generator neural network to generate a datum for a categorical variable of a categorical column of the data table, using the generator loss function including a penalty component related to the categorical column determined based on a second set of data constraints related to the categorical column, wherein the datum for the categorical variable is a part of the synthetic data record.

4. The method of claim 1, further comprising:

training the generator neural network to generate an additional column of the data table, using the generator loss function, wherein the additional column includes a different continuous variable or a categorical variable, and there is no data constraint related to the additional column, and wherein the generator loss function is without a penalty component related to the additional column.

5. The method of claim 1, further comprising:
training the discriminator neural network to perform the binary classification, using a discriminator loss function including a discriminator penalty component related to the continuous column determined based on the set of constraints related to the continuous variable.

6. The method of claim 1, wherein the set of data constraints includes the first atomic constraint and the second atomic constraint, the first atomic constraint is associated with a first atomic penalty component for the generator loss function, the second atomic constraint is associated with a second atomic penalty component for the generator loss function, and the penalty component of the generator loss function is determined based on the first atomic penalty component and the second atomic penalty component.

7. The method of claim 6, wherein the first atomic constraint is converted into a third atomic constraint including an equation with 0 on a right hand side of an equation for the third atomic constraint.

8. The method of claim 6, wherein the first atomic constraint or the second atomic constraint includes an equation with 0 on a right hand side of the equation.

9. The method of claim 1, wherein the training the generator neural network to generate the synthetic data record is performed during a training stage, and the method further includes a pre-processing stage before the training stage, a generation stage, and a post-processing stage after the training stage, and wherein the scaling factor and the cluster vector including multiple m random variables are generated for the continuous column in the pre-processing stage, and the synthetic data record generated by the generator neural network has more columns than the data table provided at the pre-processing stage.

10. The method of claim 9, wherein the datum of the continuous variable is generated based on a weighted sum of the scaling factor and the cluster vector at the pre-processing stage, the training stage, or the post-processing stage.

11. The method of claim 1, wherein the generator loss function further includes an original loss component, an information loss component defined as a discrepancy between two statistics of synthetic and real data records, and a classification loss component defined as a discrepancy between a predicted label by the generator model and a synthesized label.

12. The method of claim 1, wherein the generator neural network includes a long-short term memory (LSTM) neural network, and the discriminator neural network includes a multi-layer perceptron (MLP) neural network or a convolutional neural network (CNN).

13. A generative adversarial network (GAN) for generating a data table including synthetic data records, comprising:
a generator model including a generator neural network configured to be trained to:
generate a scaling factor and a cluster vector for a datum of a continuous variable of a continuous column of the data table of a database stored in and accessed electronically from a computer system, wherein the scaling factor is in a range of (−1, 1), the cluster vector includes m random variables of Gaussian distributions, the generator neural network is trained by minimizing a generator loss function including a penalty component related to the continuous column determined based on a set of data constraints related to the continuous column, wherein the set of data constraints includes a data constraint formed by a logical operation between a first atomic constraint and a second atomic constraint, and the penalty component of the generator loss function comprises an associated penalty component associated with the data constraint and formed by softmax or softmin operations related to the first atomic constraint and the second atomic constraint; and
generate, based on the generator loss function including the penalty component, a synthetic data record of the data table to protect privacy, wherein the synthetic data record includes the datum of the continuous variable; and
a discriminator model communicatively coupled to the generator model, wherein the discriminator model includes a discriminator neural network configured to:
receive the synthetic data record from the generator model and a real data record for the data table;
perform a binary classification to generate a classification result to indicate the synthetic data record as synthetic and the real data record as real; and
provide the classification result to the generator neural network.

14. The GAN of claim 13, wherein the generator neural network is further configured to receive the classification result from the discriminator neural network, wherein the synthetic data record is generated based on the classification result.

15. The GAN of claim 13, wherein the set of data constraints is a first set of data constraints, and the generator neural network is further configured to be trained to generate a datum for a categorical variable of a categorical column of the data table, using the generator loss function including a penalty component related to the categorical column determined based on a second set of data constraints related to the categorical column, wherein the datum for the categorical variable is a part of the synthetic data record.

16. The GAN of claim 13, wherein the generator neural network is further configured to be trained to generate an additional column of the data table, using the generator loss function, wherein the additional column includes a different continuous variable or a categorical variable, and there is no data constraint related to the additional column, and wherein the generator loss function is without a penalty component related to the additional column.

17. The GAN of claim 13, wherein the set of data constraints includes the first atomic constraint and the second atomic constraint, the first atomic constraint is associated with a first atomic penalty component for the generator loss function, the second atomic constraint is associated with a second atomic penalty component for the generator loss function, and the penalty component of the generator loss function is determined based on the first atomic penalty component and the second atomic penalty component.

18. The GAN of claim 17, wherein the first atomic constraint is converted into a third atomic constraint including an equation with 0 on a right hand side of an equation for the third atomic constraint.

19. The GAN of claim 17, wherein the first atomic constraint or the second atomic constraint includes an equation with 0 on a right hand side of the equation.

20. A non-transitory computer-readable medium having instructions stored thereon that, when executed by at least one computing device, cause the at least one computing device to perform operations of a generative adversarial network (GAN), the operations comprising:

training, by using a generator loss function, a generator neural network of a generator model of the GAN to generate a scaling factor and a cluster vector for a datum of a continuous variable of a continuous column of a data table of a database stored in and accessed electronically from a computer system, wherein the scaling factor is in a range of (−1, 1), the cluster vector includes m random variables of Gaussian distributions, the generator loss function includes a penalty component related to the continuous column determined based on a set of data constraints related to the continuous column, and the generator neural network is trained by minimizing the generator loss function including the penalty component, wherein the set of data constraints includes a data constraint formed by a logical operation between a first atomic constraint and a second atomic constraint, and the penalty component of the generator loss function comprises an associated penalty component associated with the data constraint and formed by softmax or softmin operations related to the first atomic constraint and the second atomic constraint;

training, by using the generator loss function, the generator neural network to generate a synthetic data record of the data table to protect privacy, wherein the synthetic data record includes the datum of the continuous variable;

providing the synthetic data record to a discriminator neural network of a discriminator model of the GAN, wherein the discriminator neural network is configured to receive the synthetic data record and a real data record for the data table, to perform a binary classification to generate a classification result to indicate the synthetic data record as synthetic and the real data record as real, and further to provide the classification result to the generator neural network.

21. The non-transitory computer-readable medium of claim 20, the operations further comprising:

receiving, by the generator model, the classification result from the discriminator model, wherein the synthetic data record including the datum of the continuous variable is generated based on the classification result.

\* \* \* \* \*